United States Patent
Sant et al.

(10) Patent No.: US 12,093,512 B2
(45) Date of Patent: *Sep. 17, 2024

(54) METHOD, SYSTEM AND COMPUTER PROGRAM PRODUCT FOR NAVIGATING DIGITAL MEDIA CONTENT

(71) Applicant: Lemon Inc., Grand Cayman (KY)

(72) Inventors: Philip Anthony Sant, London (GB); Dominic Blatchford, London (GB); Neal Hart, London (GB); Matthew White, London (GB)

(73) Assignee: Lemon Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,009

(22) Filed: Jun. 7, 2023

(65) Prior Publication Data

US 2023/0315263 A1  Oct. 5, 2023

Related U.S. Application Data

(63) Continuation of application No. 16/451,341, filed on Jun. 25, 2019, now Pat. No. 11,709,583, which is a
(Continued)

(30) Foreign Application Priority Data

Oct. 24, 2011 (GB) .................................. 1118315
Oct. 31, 2011 (GB) .................................. 1118784
(Continued)

(51) Int. Cl.
G06F 3/048   (2013.01)
G06F 3/0484  (2022.01)
(Continued)

(52) U.S. Cl.
CPC ........ *G06F 3/0484* (2013.01); *G06F 16/4387* (2019.01); *G06F 16/683* (2019.01); *G06F 16/783* (2019.01)

(58) Field of Classification Search
None
See application file for complete search history.

(56) References Cited

U.S. PATENT DOCUMENTS 9,141,618 B2 *  9/2015  Boldyrev ............. H04N 21/858
2003/0043191 A1 *  3/2003  Tinsley ................... G06F 9/451
                                                    715/762
(Continued)

FOREIGN PATENT DOCUMENTS

EP        2043006 A1      4/2009
WO   WO 2010131034 A1   11/2010

*Primary Examiner* — Hua Lu
(74) *Attorney, Agent, or Firm* — Faegre Drinker Biddle & Reath LLP

(57) ABSTRACT

The field of the invention relates to methods, systems and computer program products for navigating digital media content, in particular for navigating digital media content using an interface abstracted from that digital media content instead of, or as a supplement to, traditional user interface controls. There is provided a method for presenting a user interface to an end user to facilitate the searching, browsing and/or navigation of digital media content, the method comprising the steps of: (a) analysing the digital media content to create "hooks" related to the digital media content, or retrieving "hooks" in the digital media content, and (b) replacing or augmenting a graphical or textual representation of the digital media content with the "hooks."

20 Claims, 2 Drawing Sheets

Related U.S. Application Data continuation of application No. 14/353,913, filed on Apr. 24, 2014, now Pat. No. 10,353,553, which is a continuation of application No. PCT/GB2012/052634, filed on Oct. 24, 2012.

(30) Foreign Application Priority Data

| | | |
|---|---|---|
| Jan. 4, 2012 | (GB) | 1200073 |
| Mar. 21, 2012 | (GB) | 1204966 |

(51) Int. Cl.
  *G06F 16/438* (2019.01)
  *G06F 16/683* (2019.01)
  *G06F 16/783* (2019.01)

(56) References Cited

U.S. PATENT DOCUMENTS

| | | | | |
|---|---|---|---|---|
| 2004/0055442 | A1* | 3/2004 | Terada | G10H 1/0058 84/601 |
| 2005/0216417 | A1* | 9/2005 | Risan | G06F 21/10 705/52 |
| 2006/0008256 | A1* | 1/2006 | Khedouri | H04N 21/4788 348/E7.071 |
| 2006/0107295 | A1* | 5/2006 | Margis | H04N 21/2223 348/E7.071 |
| 2006/0205439 | A1* | 9/2006 | Havukainen | H04M 1/72448 340/7.62 |
| 2006/0294143 | A1* | 12/2006 | Cheng | G06F 16/4393 |
| 2007/0157261 | A1* | 7/2007 | Steelberg | H04N 21/8583 348/E5.002 |
| 2008/0005688 | A1* | 1/2008 | Najdenovski | G06F 16/64 715/765 |
| 2008/0046406 | A1* | 2/2008 | Seide | G06F 16/7328 |
| 2008/0184121 | A1* | 7/2008 | Kulas | H04N 21/8455 |
| 2008/0228581 | A1* | 9/2008 | Yonezaki | G06Q 30/02 705/14.4 |
| 2008/0304636 | A1* | 12/2008 | Souluer | H04M 11/007 379/88.17 |
| 2010/0056128 | A1* | 3/2010 | Hwang | H04M 1/72403 455/418 |
| 2010/0118200 | A1* | 5/2010 | Gelman | H04N 21/4131 348/739 |
| 2010/0169786 | A1* | 7/2010 | O'Brien | G06F 16/745 715/744 |
| 2011/0009988 | A1* | 1/2011 | Kitahara | G11B 27/329 700/94 |
| 2012/0056828 | A1* | 3/2012 | Miyazaki | G06F 3/04883 345/173 |
| 2012/0093326 | A1* | 4/2012 | Uchino | G10L 25/87 381/56 |
| 2012/0101606 | A1* | 4/2012 | Miyajima | G10H 1/0008 700/94 |
| 2012/0179757 | A1* | 7/2012 | Jones | G06Q 50/01 709/204 |
| 2012/0192227 | A1* | 7/2012 | Fleischman | H04N 21/2407 725/34 |
| 2012/0210274 | A1* | 8/2012 | Pettigrew | G09G 5/02 715/810 |
| 2012/0259927 | A1* | 10/2012 | Lockhart | H04L 51/10 709/206 |

* cited by examiner

METHOD, SYSTEM AND COMPUTER PROGRAM PRODUCT FOR NAVIGATING DIGITAL MEDIA CONTENT

CROSS-REFERENCE TO RELATED APPLICATIONS

This is a continuation of U.S. application Ser. No. 16/451,341, filed Jun. 25, 2019 which is a continuation of U.S. application Ser. No. 14/353,913, filed Apr. 24, 2014, now U.S. Pat. No. 10,353,553, which claims the priority of PCT/GB2012/052634, filed on Oct. 24, 2012, which claims priority to Great Britain Application Nos. 1118315.9, filed Oct. 24, 2011; 1118784.6, filed Oct. 31, 2011; 1200073.3, filed Jan. 4, 2012; and 1204966.4, filed Mar. 21, 2012, the entire contents of each of which are hereby fully incorporated herein by reference.

BACKGROUND OF THE INVENTION

1. Field of the Invention

The field of the invention relates to methods, systems and computer program products for navigating digital media content, particularly ones for navigating digital media content using an interface abstracted from that digital media content instead of, or as a supplement to, traditional user interface controls.

2. Description of the Prior Art

Prior art reference US2006008256A1, including prior art FIG. 2, discloses navigation of a locally stored database of digital media content may use an up/down toggle button on the device to "spin" letters up and down 802, one at a time, to create a five- or six-character string, while the list of artists or titles displayed changes to match the partial string created 803, enabling a user to zero-in on a particular artist or tide by searching alphabetically. US2006008256A1 discloses that alternatively, a user could search by other methods, such as by popularity (number of plays or downloads by users, published rankings, aggregated and averaged user ratings, volume of purchases or other ways) 804.

Prior art reference US2006008256A1, including prior art FIG. 2, discloses a search method for non-technical users. A menu tab 801 is used to indicate, and allow choice via a touch-screen, the current and available areas of search. One-to-one marketing and communications 805, triggered by the particular selection or activity of the user at a particular time, displays an appropriate message that is stored on the device following a Device-Network Synchronization and is generated based on application software on the device. Play controls 202 for nontechnical users enable play and control of located and accessed content. Users can search for new content, without being connected to the Internet or any external database, by searching the locally stored database on the device via a "spinning letter" technique 802. When letters are spun, the character string generated scrolls the listing of available content displayed in text box 803 in real time. This enables even a non-technical user to zero in and locate a particular item. Users can search content listings sorted in a variety of orders by toggling a sort button 804, which can be done alphabetically by artist or title, or by popularity, ranking or genre.

Historically, interfaces used for browsing digital media content, such as that of prior art FIG. 2, have been grounded in the same paradigm as used for browsing any digital files. That is, the browsing interface presented to the end user has been essentially graphical in nature: The GUI ("Graphical User Interface").

That form of interface traditionally relies on the use of thumbnails—images of artists and of album artwork—and graphical controls, such as buttons and lists of digital media.

That kind of legacy user interface, however, provides the end user with few if any cues as to the nature of the digital media content being browsed: Album artwork and track titles may be useful indicators that a particular musical track is available but it provides no actual cues to the user as to the content of that track. A movie poster signals the presence of a movie but, again, provides only an indirect indication as to the tone of the underlying video.

The present invention solves those historical problems by providing a browsing interface to the end user which is directly derived from the digital media content itself, and thus presents the end user with immediate cues during navigation as to the kind of digital media content being navigated.

The present invention, in a preferred embodiment, utilises DSP ("Digital Signal Processing") technology where necessary to calculate such metadata as the location of "hooks" within a piece of digital media content.

3D Audio Effect techniques, such as Surround Sound, may also be employed to cause audio, on playback, to seem to originate from a particular spatial location.

SUMMARY OF THE INVENTION

According to a first aspect of the invention, there is provided a method for presenting a user interface to an end user to facilitate the searching, browsing and/or navigation of digital media content, the method comprising the steps of:
(a) analysing the digital media content to create "hooks" related to the digital media content, or retrieving "hooks" in the digital media content, and
(b) replacing or augmenting a graphical or textual representation of the digital media content with the "hooks."
The method may further comprise:
one comprising the step of: presenting the "hooks" to the end user, so that the end user can search, browse and/or navigate the digital media content using the "hooks".
one comprising the step of: providing a unifying sound in the background to conceal any silent holes or gaps in playback.
one where the unifying sound is played in the background to conceal any silent holes or gaps in playback and/or to provide a consistent aural cue that the audio user interface is in operation.
one where the unifying sound consists of a hum, a crackling sound, white noise, audience sounds, a station identification signifier, or any other audio and/or video content.
One in which the "hook" consists of one or more extracted sections of a track of audio and/or video content which are identified as (i) being representative of that track as a whole; or (ii) being the most recognisable part or parts of that track; or (iii) being the "best" parts of that track, however defined; or (iv) being related to one or more portions of another track, including but not limited to such portions of a track as are similar to portions of other tracks, such as tracks which start in a similar manner, however defined; or (v) being evocative of that track, however defined; or (vi) a combination of one or more of the listed criteria.

One in which the "hook" is identified using one or more of digital signal processing ("DSP") technology, manually or by any other method.

One in which the "hook" consists of one or more hooks from one or more tracks ("per-track hooks"), such individual hooks being combined to constitute a single hook by means of one or more of cross-fading, juxtaposition or any other technique to combine digital media content.

One where the decision as to which method to utilise when combining multiple per-track hooks into a single hook is determined by DSP analysis of the individual tracks and/or the individual per-track hooks.

one where a set of tracks may be previewed by means of the playback of a hook for that set, that hook being created by combining the per-track hooks of the tracks which constitute that set of tracks.

one where the said set of tracks consists of tracks in a playlist, a set of search results, a group of tracks formed according to metadata or any other grouping of tracks.

one where the metadata using to form a group of tracks consists of one or more of the artist, performer, genre, year of release or re-release or creation of tracks, the release or album on which the track or tracks appear, the popularity or tracks within a given group of users of a service or any other metadata recorded about tracks.

one where the playback of a hook for a track or a set of tracks is triggered by an action performed by the user of a service.

one where an action performed by the user of a service triggers the playback of the per-track hook of a subsequent track while the current track continues playing, where the said hook is faded in and then out while the current track continues playing or where the current track is paused during playback of the hook or where the currently playing track is replaced by the hook for the duration of the hook, whether or not the currently playing track restarts again subsequently, or by any other means.

one where the decision as to how to play a hook is made using DSP processing to determine the volume at which the hook is played and/or the playback technique employed so as to ensure that the hook is clearly audible without being intrusive, according to parameters defined for a particular service, device or user.

one where an action performed by the user of a service during playback of hook is able to trigger playback of the track from which a particular per-track hook is derived.

one where playback of the said track commences at the start of that track, at the point of that track from which the hook was extracted or from any other point.

one where the said action consists of one or more of a mouse click on a graphical user interface element, a tap on a specified region of a touch-sensitive interface, a specific keyboard command, a specific vocal command, a specific gesture identified via a mouse, a touch-sensitive or motion-sensitive interface or any other machine-recognisable action.

one where hooks for tracks and/or sets of tracks are played in the background while the user is browsing said track or sets of tracks.

one where playing audio and/or video content in the background consists of one or more of cross-fading between hooks, including but not limited to per-track hooks; or playing hooks at a lower than usual volume; or playing hooks using 3D Audio Effect techniques such that the sounds appear to originate from a specific location, such as behind or to the side of the listener, or any other method or combination of methods designated as signifying that the hooks are being played in the background.

one where the user of a service is able to browse tracks or sets of tracks by browsing the hooks for those tracks or sets of tracks in addition to, or in the place of, browsing via a graphical and/or textual interface.

one where, in addition to the playback of hooks, audio narration replaces or augments any or all other visual elements of a graphical interface to enable access to a service by blind or partially sighted individuals.

one wherein the method is for presenting an audio user interface ("AUI") to an end user.

one wherein the "hooks" include audio "hooks".

one wherein the method is applied in a system comprising a display, a speaker and a computer, the computer configured to display the graphical or textual representation of the digital media content on the display, and the computer further configured to output the "hooks" using the display and/or the speaker.

one wherein the display comprises a touch screen.

one wherein the system is a personal, portable device.

one wherein the personal, portable device is a mobile phone.

one wherein the system includes a microphone, and the computer is configured to receive voice input through the microphone.

One wherein the system is operable to receive a user selection of digital media content.

one wherein the digital media content is digital music content.

One wherein the digital media content is digital video content.

one wherein the digital video content is movies, or television shows or computer games.

According to a second aspect of the invention, there is provided a system comprising a display, a speaker and a computer system, the computer system configured to display graphical or textual representation of the digital media content on the display, the computer system further configured to output "hooks" relating to the digital media content using the display and/or the speaker, the system operable to present a user interface to an end user to facilitate searching, browsing and/or navigation of digital media content, the system further operable to:

(a) analyse the digital media content to create the "hooks" related to the digital media content, or to retrieve the "hooks" in the digital media content, and (b) to replace or to augment the graphical or textual representation of the digital media content with the "hooks."

The system may be operable to implement the methods according to the first aspect of the invention.

According to a third aspect of the invention, there is provided a computer program product, which may be embodied on a non-transitory storage medium or on a cellular mobile telephone device or on another hardware device, the computer program product operable to perform a method for presenting a user interface to an end user to facilitate the searching, browsing and/or navigation of digital media content, the method the comprising the steps of:

(a) analysing the digital media content to create "hooks" related to the digital media content, or retrieving "hooks" in the digital media content, and (b) replacing or augmenting a graphical or textual representation of the digital media content with the "hooks."

The computer program product may be operable to implement the methods according to the first aspect of the invention.

There are disclosed herein mechanisms for presenting an audio user interface ("AUI") to an end user to permit the navigation of digital media content without relying entirely on graphical mechanisms to do so.

For simplicity, the AUI disclosed is presented in terms of an audio interface for navigating a music catalogue. However, similar and identical techniques to those which are disclosed below may also, in a further example embodiment of the present invention, be used to produce an interface for navigating a catalogue of video—such as movies, television shows or computer games—or any other appropriate digital media content.

DETAILED DESCRIPTION

Definitions

Figure 1:
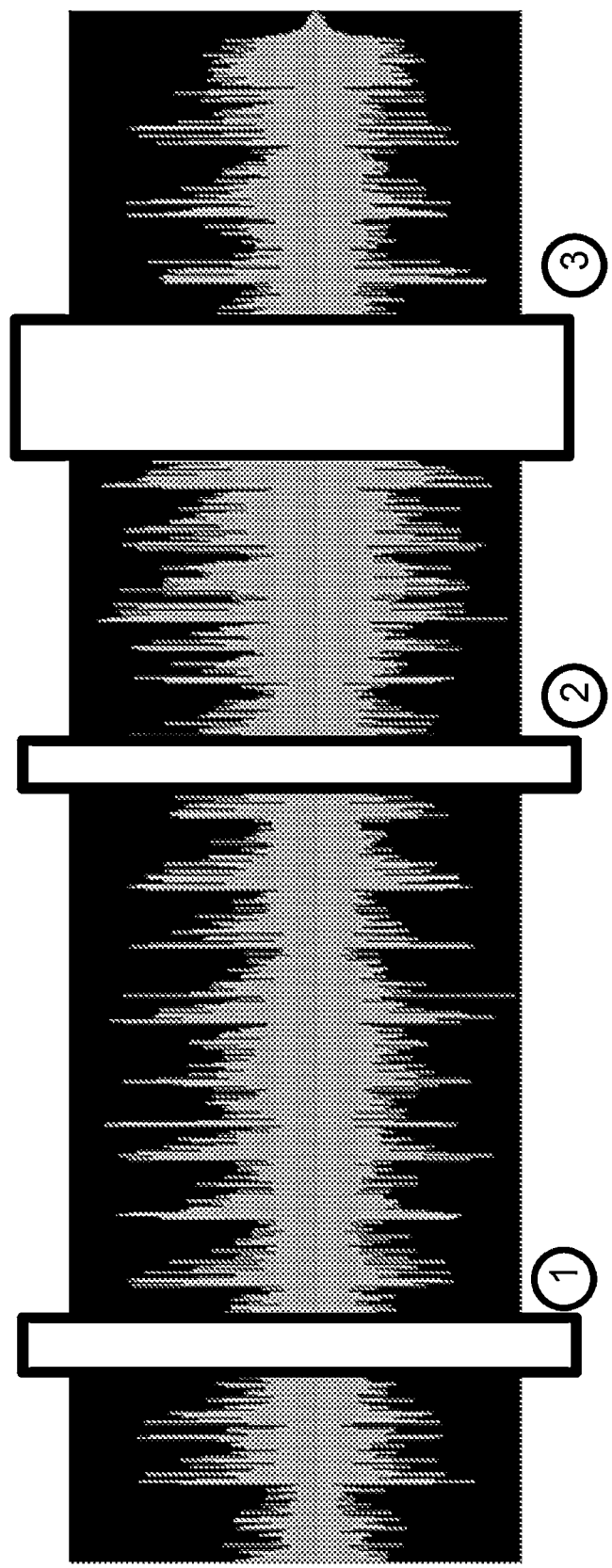
FIG. 1 shows a waveform representation of audio, indicating identified hooks.
Figure 2:
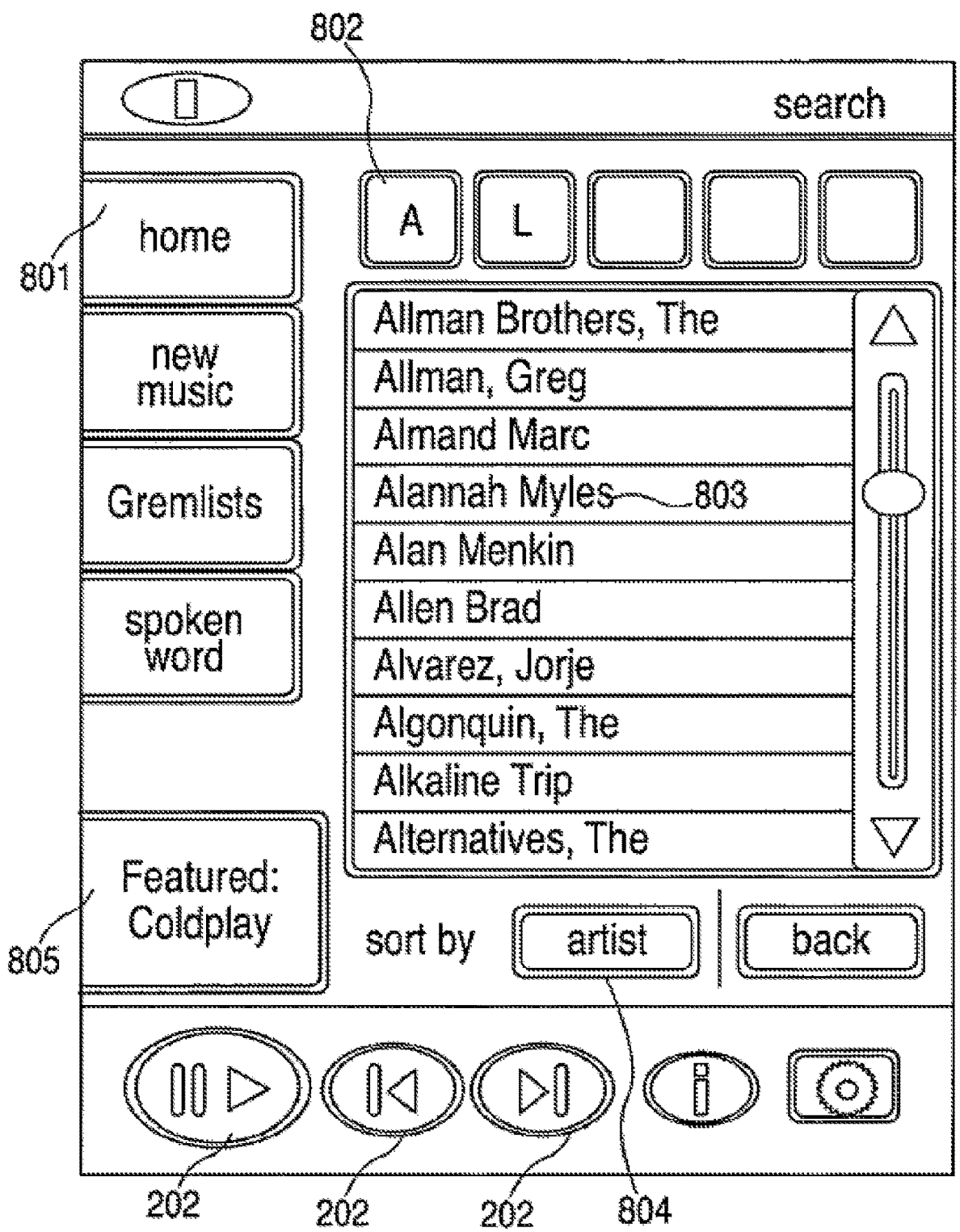
FIG. 2 shows an interface used for browsing digital media content according to prior art reference US2006008256A1.

For convenience, and to avoid needless repetition, the terms "music" and "media content" in this document are to be taken to encompass all "media content" which is in digital form or which it is possible to convert to digital form—including but not limited to books, magazines, newspapers and other periodicals, video in the form of digital video, motion pictures, television shows (as series, as seasons and as individual episodes), computer games and other interactive media, images (photographic or otherwise) and music.

Similarly, the term "track" indicates a specific item of media content, whether that be a song, a television show, an eBook or portion thereof, a computer game or a recording of the output thereof, a movie or any other discreet item of media content.

The terms "playlist" and "album" and "set of tracks" are used interchangeably to indicate collections of "tracks" which have been conjoined together such that they may be treated as a single entity for the purposes of analysis or recommendation or for any other purpose. A set of tracks may be a playlist, a set of search results, a channel (as disclosed in WO2010131034(A1), which is incorporated by reference), the favourite tracks of a given user or group of users, an album or release, the discography (in whole or in part) for a given artist, user-selected tracks, recently released tracks, forthcoming tracks or any other group of tracks.

The terms "digital media catalogue", "digital music catalogue", "media catalogue" and "catalogue" are used interchangeably to indicate a collection of tracks and/or albums to which a user may be allowed access for listening purposes. The digital media catalogue may aggregate both digital media files and their associated metadata or, in another example embodiment, the digital media and metadata may be delivered from multiple such catalogues. There is no implication that only one such catalogue exists, and the term encompasses access to multiple separate catalogues simultaneously, whether consecutively, concurrently or by aggregation. The actual catalogue utilised by any given operation may be fixed or may vary over time and/or according to the location or access rights of a particular device or end-user.

The abbreviation "DRM" is used to refer to a "Digital Rights Management" system or mechanism used to grant access rights to a digital media file.

The verbs "to listen", "to view" and "to play" are to be taken as encompassing any interaction between a human and media content, whether that be listening to audio content, watching video or image content, reading books or other textual content, playing a computer game, interacting with interactive media content or some combination of such activities.

The terms "user", "consumer", "end user" and "individual" are used interchangeably to refer to the person, or group of people making use of the facilities provided by the interface. In all cases, the masculine includes the feminine and vice versa.

The terms "device" and "media player" are used interchangeably to refer to any computational device which is capable of playing digital media content, including but not limited to MP3 players, television sets, home entertainment system, home computer systems, mobile computing devices, games consoles, handheld games consoles, IVEs or other vehicular-based media players or any other applicable device or software media player on such a device. Something essentially capable of playback of media.

The term "DSP" ("Digital Signal Processing") refers to any computational processing of digital media content in order to extract additional metadata from that content. Such calculated metadata may take a variety of forms, including deriving the tempo of a musical track or identifying one or more spots within the digital media file which are gauged to be representative of that content as a whole.

The term "hook" is used to refer to one or more portions of a digital media file which have been identified, whether via DSP or manually or by some other method, as being representative of the content as a whole, being the most recognisable parts of the track, being the "best" parts of the track, however defined, or being related to a portion of another track, such as portions of a track which are similar to portions of other tracks (e.g. tracks which start in a similar manner). For example, a movie trailer consists of a series of one or more "hooks" from the movie while particularly apposite riffs, phrases or lines from a musical track serve a similar identifying purpose. A "hook" may consist of the identified portion only or, in some instances, may also incorporate a portion of the digital media content prior to and/or after that portion of the content.

The Audio User Interface

Several elements of an Audio User Interface are disclosed below. Any single such element may be sufficient alone to constitute an embodiment of the present invention, though a preferred embodiment utilises each element disclosed below.

The Hook

A core component of the AUI ("Audio User Interface") is that of the "hook".

A "hook" is a piece of audio, video or both which is identified within a piece of digital media content as being representative of that content, whether that be representative in the sense of being evocative of that content or of being a particularly identifiable or recognisable area of that content.

For example, the opening bars of Beethoven's Fifth Symphony would be considered an identifiable "hook" for that piece, while a short segment of vocals or a particular riff or other sequence from a popular music track (such as Lulu's cry of "Weeeeeeellllll" at the start of "Shout", for example, or a specific riff from the middle of Michael Jackson's "Thriller") might similarly constitute "hooks" for those pieces. Similarly, one or more scenes of a movie or television show or a sequence recorded from a computer game may be identified as "hooks" for those items of digital media content (examples of such video "hooks" may commonly be found in trailers for those pieces of content).

A variety of ways of identifying such "hooks" exist in legacy technologies, including both manual identification of hooks and their auto-detection via DSP, digital signal processing, technologies, whether pre-existing or developed or customised for use in concert with examples of the present invention.

However identified, a given piece of digital media content may feature one or more "hooks" which may then be utilised within the Audio User Interface (AUI).

Hooks are typically short pieces of audio/video content, often no more than 10 seconds in duration and, in a preferred embodiment, approximately 1 to 6 seconds in duration.

FIG. 1 illustrates a waveform where several hooks have been identified, and marked graphically. In the example, point 1 indicates the start of the vocals, point 2 is an identified riff which is evocative of the tenor of the piece and point 3 is a section of the content which is recognisably memorable. How each hook was identified in FIG. 1 is not important for the purposes of the present invention—it is important only that such hooks can be identified for use within the AU 1, whether automatically or manually marked as points in the track.

Hooks in a digital content file may be identified for example by identifying portions of the digital content file in which there is the biggest change in tempo, sound volume, musical key, frequency spectral content, or in other ways, as would be clear to one skilled in the art.

Browsing Sets of Tracks Using Hooks

A set of tracks—such as a playlist, a set of search results, a channel (as disclosed in WO2010131034(A1), which is incorporated by reference), the favourite tracks of a given user or group of users, an album or release, the discography (in whole or in part) for a given artist, user-selected tracks, recently released tracks, forthcoming tracks or any other group of tracks—may be browsed in the context of examples of the present invention by triggering playback of the hooks of the tracks within that set.

In a preferred embodiment of the present invention, a set of tracks may be "previewed" by playing the hooks of each of its constituent tracks consecutively.

Each such hook may be cross-faded into the next, in one example embodiment, to form an apparently seamless audio sequence which provides a clear indication of the nature of that set of tracks. In another example embodiment, the hooks are simply played consecutively, with no gaps between hooks and with no cross-fading. In still another example embodiment, hooks are played consecutively with gaps, typically of very short duration, between each hook. In a preferred embodiment, DSP processing of each hook is used to identify which transitioning or "cross-fading" technique to utilise in each case.

In a preferred embodiment, the user experience is exemplified by hovering the mouse cursor (or making a finger gesture, in the case of a touch interface; or a vocal command, in the case of a vocal interface or by some other triggering mechanism, as disclosed below) over a playlist and thus triggering the playback of the hooks for the tracks within that playlist, each hook cross-fading into the next to provide the user with an overall "feel" for that playlist's contents. At any point, commands—such as single- or double-tap of a "Play" control—may be used to trigger playback of the entire playlist or of the specific track associated with the currently playing hook. Details of such commands are also disclosed below.

Where a set of tracks is browsed while a track is playing then the set of "hooks" are, in a preferred embodiment, treated in the same way as hooks for individual tracks, using the techniques disclosed below.

Browsing Tracks Using Hooks

Browsing tracks from within the Audio User Interface (AUI) relies on the use of hooks to provide the user with usable cues as to nature of the audio content being browsed.

In a traditional GUI (Graphical User Interface) it is possible to browse groups of tracks—such as forthcoming tracks, selected tracks or search results—by navigating a list of track titles or artwork. That interface does not, however, provide any clues as to the nature of those forthcoming tracks: In order to check what a track sounds like, it has been necessary to play it explicitly to a point where that track or its style becomes recognisable.

By contrast, the AUI allows forthcoming tracks to be checked, even while listening to a currently playing track if desired. In a preferred embodiment, this is accomplished by fading down the currently playing track (if any) and fading in the hook for the forthcoming track before fading back to the currently playing track ("cross-fading" between the track and the hook and back again). In a preferred embodiment, such "cross-fading" is performed using techniques disclosed in Omnifone Patent Application nos. GB1118784.6, GB1200073.3 and GB1204966.4, which are incorporated by reference.

By utilising the hook of the forthcoming track only, the "flavour"—mood, genre, tempo, suitability, etc—of that track may be sampled by the user without having to listen to the entire track. And since that sampling is performed aurally, rather than merely by viewing the track title, artwork or a text description of it, then the user is more readily able to make a decision as to whether or not he wishes to listen to that entire track even without having heard it before.

In another example embodiment, the currently playing track (if any) is effectively paused while the "hook" for the forthcoming track is played, and is restarted after that hook has been played. In still a further example embodiment, the hook is not cross-faded but is simply inserted in place of the currently playing track. In still a further example embodiment, the currently playing track continues playing and the hook is played simultaneously with that track, whether cross-faded in or played at a different volume or by using some other technique to differentiate the hook from the currently playing track.

In yet a further example embodiment, the technique used to play the hook is chosen dynamically based on Digital Signal Processing of the currently playing track and the hook. In this latter case, a loud hook played during a quiet segment of a currently playing track might be played more quietly and the currently playing track not reduced in volume, which the converse case—a quiet hook played during a loud section of a currently playing track—might, in one example embodiment, result in the track volume being reduced as the quieter hook is played, whether by cross-fading or otherwise.

In a preferred embodiment, if there is no currently playing track then hooks may be played directly, and—in a preferred embodiment—cross-faded such that each hook cross-fades into the next. In another example embodiment, no such cross-fading takes places and each hook is simply played consecutively.

Selecting a Track from a Set of Tracks

In a preferred embodiment, when playing a hook then a user-initiated trigger may be used within the AUI to cause the track from which the currently playing hook is derived to be played.

In one example embodiment, that user-initiated trigger is a traditional button, such as the "Play" button in a GUI or a control panel. In another example embodiment, that trigger is a vocal command, eye movement or a visual gesture. In still another example embodiment, that trigger is the hovering of a mouse cursor over a visual indicator. In yet another example embodiment, that trigger consists of a mouse or finger gesture on an item in the user interface. In a preferred embodiment, the appropriate trigger is accessible depending on the hardware available and the user or system preferences configured.

When triggered for playback, a preferred embodiment will play the remainder of the track from the "Hook" section onwards, omitting playback of the earlier portion of that track ("Behaviour A"). In another example embodiment, that trigger causes the hook's track to play from the start of that track, whether cross-fading from the hook to the start of that track or not ("Behaviour B"). In still another example embodiment, the behaviour is user-configurable by, for example, setting a user preference for Behaviour A or Behaviour B.

In a preferred embodiment, clicking the Play button causes Behaviour A while clicking that same button twice causes Behaviour B. In another example embodiment, some other mechanism is employed to permit user-selection between Behaviour A and Behaviour B.

Browsing Tracks

In a preferred embodiment, if no track is currently playing but the user is nonetheless browsing through tracks or sequences or tracks, such as playlists, then the hooks of browsed digital media items playback in the background. In a preferred embodiment, "in the background" indicates at a lower volume to that at which the audio would normally be played and/or partially transparent or otherwise unobtrusive video playback and/or the use of 3D Audio Effect technology to place the apparent origin of audio at a specific point, such as behind or to the side of the listener. In another example embodiment, "in the background" does not affect the volume or transparency or apparent spatial origin of the playback of the hook for the track being browsed.

Browsing tracks and sets of tracks may, in one example embodiment, be carried out by the end user by moving a mouse cursor or a finger between icons indicating tracks or sets of tracks, triggering the playback of hooks of those tracks to cross-fade in synchronisation with the movement of that cursor. In another example embodiment, eye tracking is used to control the cursor movement across the interface. In still another example embodiment, the cursor is controlled by other mechanisms, such as via vocal commands or by using the tilt control of a motion-sensitive device.

In a preferred embodiment, while browsing the user may select a track to play in full in the same manner as disclosed above, such as by pressing "Play" while a particular hook is playing.

In that case, in a preferred embodiment, the track associated with a given hook will become the currently playing track and all other behaviour of the AUI continues as disclosed above.

Slideshow Accompaniment

In one example embodiment, hooks for tracks are collected together based on some preset criteria, such as mood or genre, and played as ambient music in their own right. In another example embodiment, images—whether still or video—are similarly selected using the same or similar or, in still another example embodiment, different criteria.

The imagery and the sequence of musical hooks are then played simultaneously to form an ambient slideshow with audio accompaniment.

In a preferred embodiment, a pre-chosen set of images is analysed by DSP to determine its overall "mood" or other desired style and a sequence of audio hooks with similar moods is generated, again via DSP identification, to form an audio accompaniment to that imagery.

A La Carte Purchasing

In a preferred embodiment, playback of each hook is accompanied by a link or button via which the user is able to purchase the rights to play the track associated with that hook on one or more of that user's media player devices.

Unifying Sound

In a preferred embodiment, a low level background sounds, such as a hum or a faint crackling sound—is utilised throughout the AUI in order to conceal any silent holes or gaps in playback and/or to provide a consistent aural cue that the AUI is in operation.

Accessibility

By providing an audio interface, the AUI facilitates greater accessibility for blind or partially-sighted users.

In a preferred embodiment, those user interface components which are visual and which cannot be replaced by the AUI as disclosed above are accompanied by mark-up to permit them to be rendered using vocal narration and/or on Braille screens. Also in a preferred embodiment, any such audio narration is treated as the "currently playing track" for the purposes of the present invention disclosed above, with the playback of hooks being performed in such a manner as to permit that narration to continue to be clearly audible. For example, by allowing hooks to be played "in the background", as disclosed above, below the audio narration while browsing and/or during playback.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A method for presenting a user interface to an end user to facilitate the searching, browsing and/or navigation of digital media content, the method comprising the steps of:
    defining a collection of digital media files for playback using a digital media player;
    analyzing digital media content of the defined collection of digital media files to create hooks related to the digital media content, each hook including one or more extracted sections of a respective digital media file;
    determining if a digital media file of the collection of digital media files is currently playing on the digital media player; and in response to determining that the digital medial file is currently playing and when the end user is browsing the collection of digital media files, playing the hooks related to the collection of the digital media files browsed by the end user in a background simultaneously with the current digital medial file on the digital media player.

2. The method of claim 1, further comprising the step of:
presenting the hooks to the end user, so that the end user can search, browse and/or navigate the digital media content using the hooks.

3. The method of claim 1, the method further comprising the step of:
providing a unifying sound in a background to conceal a gap in playback.

4. The method of claim 3, wherein the unifying sound is played in the background to provide an aural cue that the audio user interface is in operation.

5. The method of claim 4, wherein the unifying sound includes a hum, a crackling sound, white noise, audience sounds, or a station identification signifier.

6. The method of claim 1, wherein each hook is an extracted section of a track of audio and/or video content that is at least one of:
representative of that track as a whole;
a most recognizable part or parts of that track;
related to one or more sections of another track; or
evocative of that track.

7. The method of claim 1, further comprising the step of:
augmenting a graphical representation of the digital media content with the hooks related to the digital media content.

8. The method of claim 7, wherein the graphical representation includes the first extracted section as a first pre-track hook from the first digital media file and the second extracted section as a second pre-track hook from the second digital media file to constitute a single hook for the digital media files by one or more of cross-fading or juxtaposition of the per-track hooks.

9. The method of claim 8, wherein a decision as to which technique to utilize when combining multiple per-track hooks into a single hook is determined by DSP analysis of the digital media files and/or the per-track hooks.

10. The method of claim 7, wherein an action received from the end user associated with a per-track hook of the graphical representation triggers playback of a track from which the per-track hook is derived.

11. The method of claim 10, wherein the action includes one or more of a mouse click on a graphical user interface element, a tap on a specified region of a touch-sensitive interface, a specific keyboard command, a specific vocal command, or a specific gesture identified via a mouse, a touch-sensitive interface, or motion-sensitive interface.

12. The method of claim 1, wherein a set of tracks is previewed by a playback of a hook for that set, that hook being created by combining per-track hooks of the tracks that constitute the set of tracks.

13. The method of claim 12, wherein the set of tracks includes at least one of:
tracks in a playlist, a set of search results, or a group of tracks formed according to metadata.

14. The method of claim 13, wherein the metadata used to form a group of tracks includes one or more of an artist, performer, genre, year of release or re-release or creation of tracks, a release or album on which the tracks appear, or a popularity of tracks within a given group of users of a service.

15. The method of claim 1, wherein a playback of a hook for a track or a single hook for a set of tracks is triggered by an action performed by the end user.

16. The method of claim 1, wherein:
the hooks are played in response to an action performed by the end user; and
the hooks are faded in and then faded out.

17. The method of claim 1, wherein:
a digital media file of the collection of digital media files is not currently playing; and
when the end user is browsing the collection of digital media files, the hooks related to the collection of digital media files browsed by the end user are played in a background.

18. The method of claim 17, wherein:
playing the hooks in the background comprises playing the hooks using 3D Audio Effect techniques such that the hooks appear to originate from a specific location; or
audio narration replaces or augments a visual element of a graphical interface to enable access by blind or partially sighted individuals.

19. A system comprising a display and a speaker operable to facilitate searching, browsing and/or navigation of digital media content, the system further operable to:
define a collection of digital media files for playback using the digital media player;
analyze the digital media content of the defined collection of digital media files to retrieve hooks related to the digital media content, each hook including one or more extracted sections of a respective digital media file;
determine if a digital media file of the collection of digital media files is currently playing on the digital media player; and
in response to the determination that the digital medial file is currently playing and when the end user is browsing the collection of digital media files, play the hooks related to the collection of the digital media files browsed by the end user in a background simultaneously with the current digital medial file on the digital media player.

20. A computer program product embodied on a non-transitory storage medium, the computer program product executable to perform a method for presenting a user interface to an end user to facilitate the searching, browsing and/or navigation of digital media content, the computer program product executable to:
define a collection of digital media files for playback using a digital media player;
analyze digital media content of the defined collection of digital media files to determine hooks related to the digital media content, each hook including one or more extracted sections of a respective digital media file;
determine if a digital media file of the collection of digital media files is currently playing;
in response to the determination that the digital medial file is currently playing and when the end user is browsing the collection of digital media files, play the hooks related to the collection of the digital media files browsed by the end user in a background simultaneously with the current digital medial file.

* * * * *